Oct. 29, 1935.  W. G. WHITMAN  2,018,986
CONVERSION OF HYDROCARBON OILS
Filed July 1, 1931
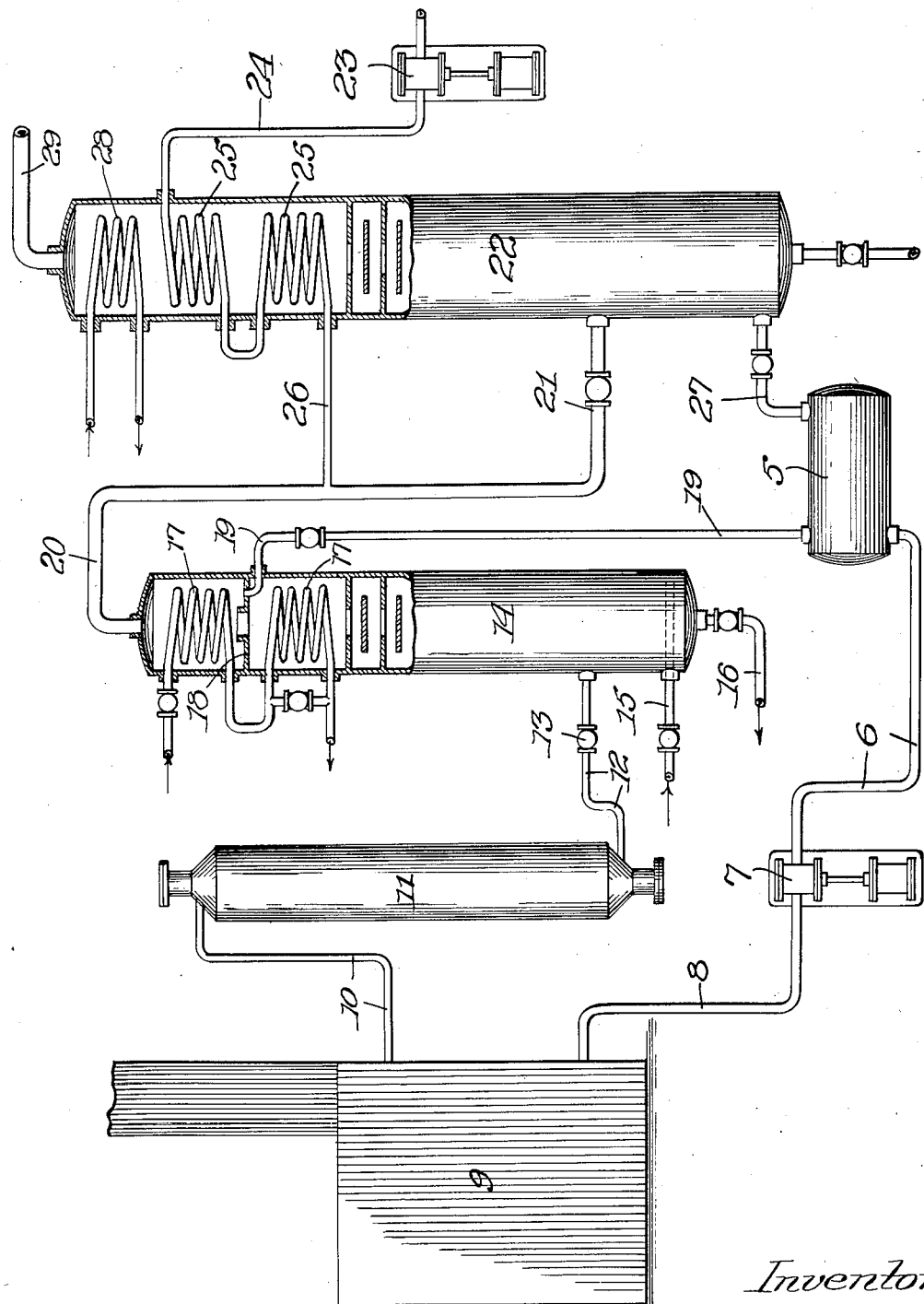
Inventor:
Walter G. Whitman,
By Dyrenforth, Lee, Chritton & Wiles
Attys Patented Oct. 29, 1935

2,018,986

UNITED STATES PATENT OFFICE 2,018,986

CONVERSION OF HYDROCARBON OILS

Walter G. Whitman, Whiting, Ind., assignor to Standard Oil Company, Whiting, Ind., a corporation of Indiana Application July 1, 1931, Serial No. 548,231

8 Claims. (Cl. 196—48)

The present invention relates to improvements in processes and apparatus for the conversion of hydrocarbon oils, and will be fully understood from the following description, illustrated by the accompanying drawing, in which the figure shows diagrammatically a layout of apparatus suitable for carrying the invention into effect.

In accordance with the present invention, the oil to be subjected to cracking conditions of temperature and pressure, and which may have been collected in a suitable container, for example, the insulated mixing or composite feed tank 5, is picked up through line 6 by pump 7 and forced through line 8 to the pipe still furnace 9, in which it is heated to the desired cracking temperature while pressure is maintained upon it. From the pipe still 9, the heated oil is discharged through the line 10 to the insulated reaction chamber 11, in which a high cracking temperature and pressure is maintained on the oil and further conversion thereof takes place. The pressure maintained upon the oil in the passage through the pipe still furnace 9 and the reaction chamber 11 is preferably above 150 lbs. gauge, say 250 lbs. or higher. In general, pressures of 750 lbs. or thereabouts will be employed, with cracking temperatures exceeding 800° F. and preferably from 850 to 900° F. or higher.

From the reaction chamber 11, the hot oil products pass through the line 12 provided with pressure release valve 13 into the lower portion of an evaporator tower 14. The latter is maintained at a superatmospheric pressure lower than the pressure prevailing in the reaction chamber 11, the pressure in the evaporator tower 14 being such that the low-boiling constituents desired in the final distillate product are completely vaporized therein. Thus, pressures of 45 to 200 lbs. may prevail in the evaporator tower 14, there being substantial further vaporization of constituents of liquids received therein from the reaction chamber 11 by reason of the reduced pressure therein. The separated liquids are collected in the lower portion of the evaporator tower, and may, if desired, be stripped of their lighter constituents by the introduction of steam or other inert gas through the line 15. The unvaporized liquid or tar is withdrawn from the lower portion of the evaporator tower through the valved discharge line 16, by which the tar is conducted either to a cooler or to a flash chamber (not shown) wherein further vaporization of the tar is effected by reduction in pressure thereupon.

The vapors rising in the evaporator tower 14 may be cooled therein by the cooling coils 17 disposed in the upper portion of the tower, these cooling coils producing a partial condensation, the resulting reflux condensate being used, at least in part, to remove entrained heavy liquids from the ascending vapors. A portion of the reflux may be collected, for example, in the top of plate 18, and removed through line 19, by which it is conducted to the mixing or composite feed tank 5.

Vapors uncondensed in the evaporator tower 14 pass out through the vapor line 20 provided with a valve 21, and enter the fractionating tower 22 at an intermediate point in the lower portion thereof. The fractionating tower 22 may be at the same or at a lower pressure than the evaporator tower 14, the pressure differential, if any, being controlled by means of the valve 21. The vapors, rising in the fractionating tower 22, are cooled by fresh oil for the system, which is forced by pump 23 through the line 24 and the coils 25 in the upper portion of the column. The fresh oil is thus preheated, for example, to temperatures between 400 and 500° F., and the preheated fresh oil, after leaving the coils 25, passes through the line 26 by which the fresh oil is discharged directly into the vapor line 20 leading into the fractionating column 22. In this way, an intimate mixture of the preheated fresh oil and the vapors takes place in the vapor line 20 and the vapors and liquid are in physical and thermal equilibrium when they enter the fractionating column 22. This introduction of fresh oil causes a portion of the heavier constituents of the vapors to be condensed, resulting in a substantial decrease in the velocity of the vapors flowing to the column 22, and a decrease of the tendency of the vapors to corrode the apparatus. It further permits the use of towers of less diameter because of the reduction in vapor velocity and it also reduces the tendency towards entrainment in a tower of a given diameter. The unvaporized portions of the fresh oil, together with condensate formed from the rising vapors, collect in the lower portion of the fractionating tower 22, and pass therefrom through valved discharge line 27 into the composite feed tank 5.

The vapors in the fractionating column 22 may be further cooled and their exit temperature closely controlled by the coil 28 in the top of the tower, through which a suitable cooling medium is passed, and the uncondensed vapors, consisting almost entirely of the desired low boiling product, pass out through the vapor line 29 to suitable condensing and gas separating apparatus (not shown).

I claim:
1. In the conversion of heavy hydrocarbon oils into lighter hydrocarbon oils, the method which comprises heating oil while in continuous flow to a cracking temperature under pressure, discharging the heated products into a chamber wherein separation of vapors from unvaporized liquids takes place, separately withdrawing said vapors and said unvaporized liquids from said chamber, freeing the separated vapors of entrained heavy liquids by causing countercurrent contact of a refluxing liquid therewith and passing the resulting clean vapors through a conduit of restricted cross-sectional area directly into a fractionating column, cooling the vapors in said column by passing fresh oil in indirect heat exchange therewith, thereby preheating the fresh oil and forming a reflux condensate, discharging the fresh oil thus preheated into an intermediate point in the conduit by which the separated vapors are introduced into the fractionating column so that said fresh oil is passed into said fractionating column with said vapors, removing fractionated vapors from said fractionating column and forming a desired product therefrom, and collecting unvaporized portions of the fresh oil and reflux condensate in said column, while preventing the mixture therewith of unvaporized liquid from said chamber.

2. In the conversion of heavy hydrocarbon oils into lighter hydrocarbon oils, the method which comprises heating oil while in continuous flow to a cracking temperature under pressure, discharging the heated products into a chamber wherein separation of vapors from unvaporized liquids takes place, separately withdrawing said vapors and said unvaporized liquids from said chamber, passing the separated vapors through a conduit of restricted cross-sectional area into a fractionating column, cooling the vapors in said column by passing fresh oil in indirect heat exchange therewith, thereby preheating the fresh oil and forming reflux condensate, discharging the fresh oil thus preheated into an intermediate point in the conduit by which the separated vapors are introduced into the fractionating column so that said fresh oil is passed into said fractionating column with said vapors, collecting unvaporized portions of the fresh oil and reflux condensate in said column withdrawing a mixture of unvaporized fresh oil and reflux condensate from said column, and subjecting the mixture thus withdrawn to the heating operation as hereinbefore set forth.

3. A method according to claim 1 wherein the pressure on the mixed vapors and fresh charge is reduced just prior to the introduction thereof into said fractionating column.

4. In apparatus for converting high boiling hydrocarbon oils into lower boiling hydrocarbon oils, means for heating oil to a cracking temperature while maintaining pressure thereupon, a separating chamber, means for discharging the heated oil products into said separating chamber, a draw-off line for removing unvaporized liquids from said separating chamber and diverting them from the process, a vapor conduit of restricted cross-sectional area leading from said separating chamber to remove separated vapors therefrom, means for separating entrained liquids from the separated vapors prior to their removal from said chamber, a fractionating column into which said vapor conduit discharges, cooling coils in the upper portion of said fractionating column, means for passing fresh oil through said cooling coils, means for conducting the fresh oil after passing through said cooling coils into an intermediate point in said vapor conduit, whereby the fresh oil is introduced into the fractionating column with the vapors passing through said conduit, and means for removing fractionated vapors from said fractionating column and condensing them.

5. In apparatus for converting high boiling hydrocarbon oils into lower boiling hydrocarbon oils, means for heating oil to a cracking temperature while maintaining pressure thereupon, a separating chamber, means for discharging the heated oil products into said separating chamber, a vapor conduit of restricted cross-sectional area leading from said separating chamber to remove separated vapors therefrom, a fractionating column into which said vapor conduit discharges, cooling coils in the upper portion of said fractionating column, means for passing fresh oil through said cooling coils, and means for conducting the fresh oil after passing through said cooling coils into an intermediate point in said vapor conduit, whereby the fresh oil is introduced into the fractionating column with the vapors passing through said conduit, means for collecting condensate and unvaporized liquid in the fractionating column, means for withdrawing the collected unvaporized fresh oil and condensate from the fractionating column and forcing them through the oil heating means.

6. Apparatus according to claim 4 wherein a pressure reducing valve is interconnected in said vapor conduit between the point of introduction of said fresh oil and the point of connection of said vapor conduit with said fractionating column.

7. In the conversion of heavy hydrocarbon oils into lighter hydrocarbon oils, the method which comprises heating oil while in continuous flow to a cracking temperature under pressure, discharging the heated products into a chamber wherein separation of vapors from unvaporized liquids takes place, indirectly cooling said vapors within said chamber to form a condensate for removing entrained heavy liquids from said vapors, passing the separated vapors through a conduit into a fractionating column, cooling the vapors in said column by passing fresh oil in indirect heat exchange therewith, thereby preheating the fresh oil to a temperature of from 400 to 500° F. and forming reflux condensate, discharging the fresh oil thus preheated into an intermediate point in the conduit by which the separated vapors are introduced into the fractionating column so that said fresh oil is passed into said fractionating column with said vapors, collecting unvaporized portions of the fresh oil and reflux condensate in said column, withdrawing a mixture of unvaporized fresh oil and reflux condensate from said column, adding thereto condensate formed by the cooling step first mentioned, and subjecting the resulting composite mixture to the heating operation hereinbefore set forth.

8. In the conversion of heavy hydrocarbon oils into lighter hydrocarbon oils, the method which comprises heating oil while in continuous flow to a cracking temperature under pressure, discharging the heated products into a chamber wherein separation of vapors from unvaporized liquids takes place, separately withdrawing said vapors and said unvaporized liquids from said chamber, freeing the separated vapors of entrained heavy liquids by causing counter-current contact of a refluxing liquid therewith and passing the resulting clean vapors through a conduit of restricted cross-sectional area directly into a fractionating column, cooling the vapors in said column by passing fresh oil in indirect heat exchange therewith, thereby preheating the fresh oil and forming a reflux condensate, discharging the fresh oil thus preheated into an intermediate point in the conduit by which the separated vapors are introduced into the fractionating column so that said fresh oil is passed into said fractionating column with said vapors, removing fractionated vapors from said fractionating column and forming a desired product therefrom, collecting unvaporized portions of the fresh oil and reflux condensate in said column, while preventing the mixture therewith of unvaporized liquid from said chamber, and subjecting unvaporized portions of the fresh oil and reflux condensate so collected to a cracking operation to form additional quantities of lighter oils.

WALTER G. WHITMAN.